US012689062B2

(12) United States Patent
Faustov et al.

(10) Patent No.: US 12,689,062 B2
(45) Date of Patent: Jul. 21, 2026

(54) ELECTROLYTE FOR ELECTROCHEMICAL CELL

(71) Applicant: BroadBit Batteries Oy, Espoo (FI)

(72) Inventors: Artem Faustov, Espoo (FI); Andras Kovacs, Espoo (FI); David Brown, Helsinki (FI)

(73) Assignee: BROADBIT BATTERIES OY, Espoo (FI)

( * ) Notice: Subject to any disclaimer, the term of this patent is extended or adjusted under 35 U.S.C. 154(b) by 678 days.

(21) Appl. No.: 18/003,285

(22) PCT Filed: Jun. 24, 2021

(86) PCT No.: PCT/FI2021/050493
§ 371 (c)(1),
(2) Date: Dec. 23, 2022

(87) PCT Pub. No.: WO2021/260274
PCT Pub. Date: Dec. 30, 2021

(65) Prior Publication Data

US 2023/0253620 A1 Aug. 10, 2023

(30) Foreign Application Priority Data

Jun. 26, 2020 (FI) .................................... 20205686

(51) Int. Cl.
*H01M 10/0567* (2010.01)
*H01M 10/0569* (2010.01)

(52) U.S. Cl.
CPC ... *H01M 10/0567* (2013.01); *H01M 10/0569* (2013.01); *H01M 2300/004* (2013.01)

(58) Field of Classification Search
CPC ......... H01M 10/0567; H01M 10/0569; H01M 2300/004
(Continued)

(56) References Cited

U.S. PATENT DOCUMENTS

2008/0026297 A1* 1/2008 Chen ................ H01M 10/0567 429/207
2009/0017386 A1* 1/2009 Xu ....................... H01M 4/621 29/623.2

(Continued)

FOREIGN PATENT DOCUMENTS

CN 101771167 A * 7/2010 ........ H01M 10/0525
CN 102544591 A 7/2012

(Continued)

OTHER PUBLICATIONS

Finnish Patent and Registration Office, Search Report Issued in Application No. 20205686, Jan. 26, 2021, 2 pages.

(Continued)

*Primary Examiner* — Patricia L. Hailey
(74) *Attorney, Agent, or Firm* — McCoy Russell LLP

(57) ABSTRACT

In the present disclosure, described is an electrolyte for an electrochemical cell comprising a solvent mixture comprising at least two carbonate solvents. Disclosed is also an electrolyte for an electrochemical cell comprising a solvent mixture comprising co-solvent DMC, co-solvent EC, and co-solvent PC, and additives SCN and FEC, wherein the mass % of each of additives SCN and FEC are less than 5%.

19 Claims, 4 Drawing Sheets

(58) Field of Classification Search
USPC .......................................... 429/331; 252/500
See application file for complete search history.

(56) References Cited

U.S. PATENT DOCUMENTS

| | | | | |
|---|---|---|---|---|
| 2012/0189920 | A1* | 7/2012 | Li | H01M 4/505 429/332 |
| 2014/0178770 | A1* | 6/2014 | Xu | C25D 13/22 429/188 |
| 2020/0052334 | A1* | 2/2020 | Shatunov | H01M 10/0569 |
| 2020/0136134 | A1 | 4/2020 | Chavillon et al. | |

FOREIGN PATENT DOCUMENTS

| | | | | |
|---|---|---|---|---|
| CN | 103208654 | A | 7/2013 | |
| CN | 107305963 | A * | 10/2017 | H01M 10/0569 |
| EP | 3651256 | A1 | 5/2020 | |
| EP | 3516724 | B1 | 9/2020 | |
| JP | 2009054587 | A | 3/2009 | |
| JP | 2011222473 | A | 11/2011 | |
| JP | 2013093322 | A | 5/2013 | |
| JP | 2016062760 | A | 4/2016 | |
| TW | 200919805 | A | 5/2009 | |
| WO | WO-2019042741 | A1 * | 3/2019 | H01M 10/4235 |
| WO | 2020070391 | A1 | 4/2020 | |
| WO | 2020131648 | A1 | 6/2020 | |
| WO | 2021166663 | A1 | 8/2021 | |

OTHER PUBLICATIONS

ISA European Patent Office, International Search Report Issued in Application No. PCT/FI2021/050493, Dec. 6, 2021, WIPO, 6 pages.

Finnish Patent and Registration Office, Office Action Issued in Application No. 20205686, Jun. 27, 2022, 6 pages.

Japanese Patent Office, Office Action Issued in Application No. 2022-579819, Jul. 22, 2025, 18 pages. (Submitted with Machine Translation).

State Intellectual Property Office of the People's Republic of China, Office Action and Search Report Issued in Application No. 202180052874.X, Aug. 28, 2025, 18 pages. (Submitted with Machine Translation).

Taiwanese Intellectual Property Office, Ministry of Economic Affairs, Office Action Issued in Application No. 110123370, Mar. 24, 2025, 27 pages. (Submitted with Machine Translation).

* cited by examiner

ELECTROLYTE FOR ELECTROCHEMICAL CELL

CROSS REFERENCE TO RELATED APPLICATIONS

The present application is a U.S. National Phase of International Application No. PCT/FI2021/050493 entitled "IMPROVED ELECTROLYTE FOR ELECTROCHEMICAL CELL," and filed on Jun. 24, 2021. International Application No. PCT/FI2021/050493 claims priority to Finnish Patent Application No. 20205686 filed on Jun. 26, 2020. The entire contents of each of the above-listed applications are hereby incorporated by reference for all purposes.

TECHNICAL FIELD

The present disclosure relates to an electrolyte for an electrochemical cell comprising a solvent mixture comprising at least two carbonate solvents. The present disclosure further relates to an electrolyte for an electrochemical cell comprising a solvent mixture comprising co-solvent DMC, co-solvent EC, and co-solvent PC, and additives SCN and FEC, wherein the mass % of each of additives SCN and FEC are less than 5%.

BACKGROUND

High performance and low cost batteries are advantageous for many applications, e.g. energy storage for electric vehicles or electric grids. The presently market-leading battery technology is the lithium-ion (Li-ion) battery technology. State-of-the-art Li-ion batteries employ, for instance, certain graphite-based anodes, metal-oxide cathodes, and organic electrolytes. The commercially preferred cathode formulation is typically based on a Nickel-Cobalt-Manganese Oxide (NCM), Lithium-Cobalt-Oxide (LCO) or Nickel-Cobalt-Aluminum (NCA) formulations. However, the long term prospects of these cathode formulations are hindered by the limited supply of cobalt, which is a known bottleneck for future increases in battery production volumes. Thus, while NCM yields the highest energy density, its cobalt content limits its production scalability. To avoid cobalt, Lithium Iron Phosphate (LFP) cathode materials are often used, even though it results in reduced energy density. The commercially preferred electrolyte formulation for these anodes and cathodes is based on a mixture of carbonate solvents with LiPF6 electrolyte salt. However, the low chemical stability of the LiPF6 electrolyte salt restricts the battery operating temperature range and necessitates complex and costly thermal management of battery packs. Additionally, during thermal runaway or other cell abuse conditions, $LiPF_6$ reacts with other electrolyte molecules, generating toxic compounds. The present invention aims to solve the above mentioned problems.

SUMMARY

According to one embodiment of the present invention, in order to improve the safety and operating temperature range of batteries, low chemical stability $LiPF_6$ electrolyte salt is replaced by a more stable alternative salt, which gives similar electrolyte conductivity. Said electrolyte may be compatible with a wide range of anodes, cathodes and separators. Thus, one aspect of the current invention relates, in general, to electrolytes for lithium based batteries, e.g., lithium-ion batteries, that may provide good performance at elevated temperatures. The electrolyte may be compatible with high capacity lithium metal oxide cathode active materials. The invention is further related to high temperature (e.g. greater than 60° C.) tolerant electrolytes that can cycle stably for a many cycles at high currents. Another aspect of the current invention relates to electrochemical cells made from said electrolytes. These cells may exhibit high temperature tolerance and long cycle life.

Another aspect of the invention is a cathode material, which may be compatible with the described electrolyte. The cathode may be cobalt and nickel free.

Disclosed is an electrolyte for an electrochemical cell comprising a solvent mixture comprising at least two carbonate solvents. At least one of the carbonate solvents may be an ethylene carbonate (EC) and/or at least one of the carbonate solvents may comprise a dimethyl carbonate (DMC). At least one of the carbonate solvents may comprise propylene carbonate (PC). The electrolyte may further comprise at least two electrolyte additives. At least one of the electrolyte additives may comprise a carbonate-type additive or a nitrile-type additive. At least one of the electrolyte additives comprises a non-ionic organic additive. A second additive may comprise a nitrile-type additive. At least one non-ionic organic additive may comprise a cyclic carbonate based additive or dioxolane. At least one cyclic carbonate based additive may comprise 1,3-cyclic carbonate, chloroethylene carbonate, and/or fluoroethylene carbonate (FEC) and/or combinations thereof. At least one nitrile-type additive may comprise an acetonitrile, adiponitrile, glutaronitrile, pimelonitrile, malononitrile (MLN) and/or a succinonitrile (SCN) and/or a combination thereof. The electrolyte may further comprise a lithium salt. The lithium salt concentration may be between 0.1 and 6 M. At least one lithium salt may comprise, Lithium tetrafluoroborate ($LiBF_4$), Lithium Bis(oxalato)borate (LiBOB), Lithium hexafluorophosphate ($LiPF_6$) Lithium DiFluorooxalotoborate (LiDFOB) or any combination thereof. The number of carbonate solvents may be three. The three carbonate solvents may be Ethylene Carbonate (EC), Propylene Carbonate (PC) and Dimethyl Carbonate (DC). The amount of any individual additive may be from 0.01 mass percent to 15 mass percent of the total mass of the electrolyte. At least one of the non-ionic organic additives may be fluoroethylene carbonate (FEC). At least one of the nitrile-type additives may be succinonitrile (SCN). The mass proportion of the non-ionic organic additive may be between 0.5% and 5% of the total mass of electrolyte. The mass proportion of nitrile-type additive may be between 0.1% and 3% of the total mass of electrolyte.

An electrolyte for an electrochemical cell is described comprising a primary lithium salt. The primary lithium salt may comprise at least 50% of the lithium salt in the electrolyte. The electrolyte may comprise a solvent mixture. The solvent mixture may comprise succinonitrile (SCN) as a co-solvent. The solvent mixture may comprise one or more carbonate-type co-solvents. The carbonate-type co-solvents may comprise at least 5 mass % of the electrolyte. At least one of the carbonate-type co-solvent may have SEI-forming capability. One carbonate-type co-solvent may be fluoroethylene carbonate (FEC). One carbonate-type co-solvent may be FEC. Another carbonate-type co-solvent may be DMC. One carbonate-type co-solvent may be FEC, and another carbonate-type co-solvent may be DMC. The primary lithium salt may be LiDFOB, $LiPF_6$, $LiBF_4$, LiBOB or LiTFSI. The electrolyte may further comprise a secondary lithium salt. The secondary lithium salt may comprise less than 50% of the total lithium salt in the electrolyte. The secondary lithium salt may be a boron containing lithium salt. The boron containing lithium salt may be LiDFOB, LiBF4 and/or LiBOB or any combination thereof.

An electrolyte for an electrochemical cell is described. The electrolyte may comprise a solvent mixture. The solvent mixture may comprise one, two or all of co-solvent DMC, co-solvent EC, and co-solvent PC. The solvent may comprise one or both of additives SCN and FEC. The mass % of each of additives SCN and FEC may be less than 5%.

An electrochemical cell comprising any of the described electrolytes, an anode and a cathode. The cathode may comprise Lithium manganese nickel oxide (LMNO), Lithium-Manganese-Iron-Phosphate (LMFP), Nickel-Cobalt-Manganese oxide (NCM), Lithium-Cobalt-Oxide (LCO), Nickel-Cobalt-Aluminum (NCA) and/or Lithium Iron Phosphate (LFP). The anode may comprise lithium, carbon and/or silicon. The anode may comprise natural and/or artificial graphite, hard carbon, graphite-silicon mixture, silicon, silicon oxide (SiO), silicon, LTO (Lithium-Titanium-Oxide) and/or metallic lithium. Other anodes and cathodes are possible according to the invention.

The electrolytes of the current invention may enable simultaneously higher performance, safer and more robust and scalable and sustainable batteries. The electrolytes described herein for lithium-ion based batteries may have improved temperature tolerance. The improved temperature tolerance may be over appropriate temperature ranges for usage in vehicles, grid storage and stabilization, and other applications. In particular, the electrolytes may be suitable for working temperatures up to, and even exceeding, 60° C. Furthermore, the electrolytes may provide improved high power performance and/or the ability to survive high currents. The electrolytes may, for instance, allow some batteries to work at, and even exceed, 5C of constant current discharge and may exceed 10C pulsed current discharge. The corresponding batteries may be repeatedly charged and discharged. The electrolytes of the current invention may provide improved cycle life. For instance, the number of charge/discharge cycles may be more than 1000 cycles, may even exceed 1500 cycles and may even exceed 5000 cycles. The batteries may be able to operate at high efficiency (greater than 95% RT efficiency at 2C charge/discharge). The batteries may use common raw materials. The batteries may be cobalt, nickel and/or rare-earth metal free. The batteries may be non-toxic. The batteries may have no possibility of generating toxic compounds, such as hydrogen fluoride (HF). The batteries may have no possibility to generate other toxic compounds. The batteries may be non-flammable. The batteries may have preferably 4.2 V+/−0.5 V, and more preferably 4.2 V+/−0.4 V, and more preferably 4.2 V+/−0.3 V, and more preferably 4.2 V+/−0.2 V and most preferably 4.2 V+/−0.1 V maximum charging voltage limit. The batteries may have a max charging voltage between any combination of limits thereof. The batteries may have preferably 2.5 V+/−0.5 V, and more preferably 2.5 V+/−0.4 V, and more preferably 2.5 V+/−0.3 V, and more preferably 2.5 V+/−0.2 V and most preferably 2.5 V+/−0.1 V discharge voltage limit. The batteries may have a min voltage between any combination of limits thereof. The batteries may have preferably 3.8 V+/−0.5 V, and more preferably 3.8 V+/−0.4 V, and more preferably 3.8 V+/−0.3 V, and more preferably 3.8 V+/−0.2 V and most preferably 3.8 V+/−0.1 V nominal operating voltage. The operating voltage and energy density performance of the disclosed invention may be at the same level as the performance of presently market-leading battery cells. Thereby, these disclosed improvements may not come at the expense of battery performance. Consequently, the described invention is beneficial to industry and commerce.

BRIEF DESCRIPTION OF THE DRAWINGS

The accompanying drawing, which is included to provide a further understanding of the embodiments and constitute a part of this specification, illustrates various embodiments. In the drawings.

DETAILED DESCRIPTION

Figure 1A:
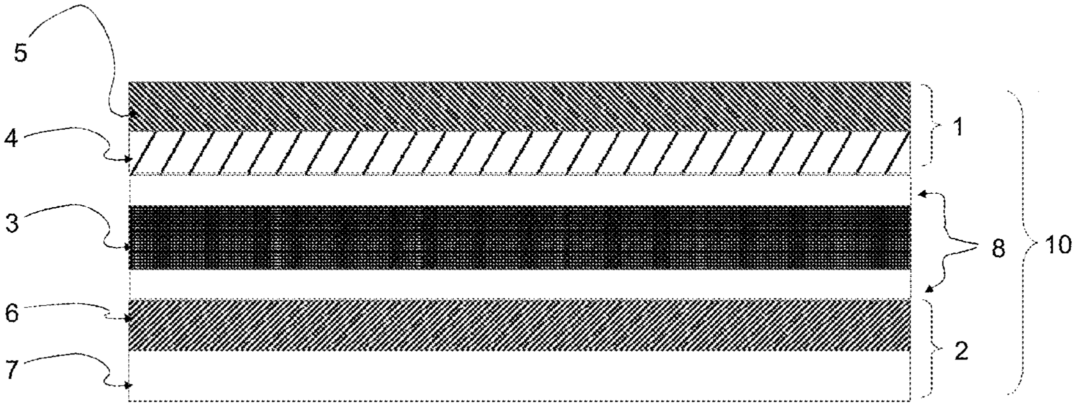
FIG. 1. Schematic of cell structure according to several embodiment of the invention (FIG. 1*a*: Single stack, FIG. 1*b*: single stack with two sided anodes and cathodes, FIG. 1*c*: Multi stack.

An electrolyte for an electrochemical cell is described. According to one embodiment of the invention, the electrolyte may comprise one or more lithium salts. Here, a lithium salt may refer to a salt comprising lithium. The lithium salt may comprise a primary lithium salt and one or more secondary lithium salts. The use of secondary lithium salts has surprisingly been found to improve the cycling stability of electrochemical cells. The use of secondary lithium salts has surprisingly been found to improve the high temperature cycling stability of electrochemical cells.

The one or more lithium salts concentration may be above 0.1 and more preferably above 0.2 and more preferably above 0.3 and more preferably above 0.4 and most preferably above 0.5 M. The one or more lithium salts concentration may be below 6, and more preferably below 5, and more preferably below 4, and more preferably below 3.5, and more preferably below 3, and more preferably below 2.75, and more preferably below 2.5, and more preferably below 2.25, and most preferably below 2 M. The one or more lithium salts' concentration may be, for instance, between 0.1 and 6 M and more preferably between 0.2 and 5 M and more preferably between 0.3 and 4 M and more preferably between 0.4 and 3 M and most preferably between 0.5 and 2 M. In one embodiment of the invention, the one or more lithium salts concentration may between 0.6 and 1.9 M. In one embodiment of the invention, the one or more lithium salts concentration may between 0.7 and 1.8 M. In one embodiment of the invention, the one or more lithium salts concentration may between 0.8 and 1.7. In one embodiment of the invention, the one or more lithium salts concentration may between 0.9 and 1.6 M. In one embodiment of the invention, the one or more lithium salts concentration may between 1 and 1.5 M. In one embodiment of the invention, the one or more lithium salts concentration may be approximately 1.25 M. Other concentrations of lithium salts are possible according to the invention. The one or more lithium salts concentration may be between any combination of the upper and lower values described, wherein the upper limit is equal to or above the lower limit, according to the invention.

The lithium salt may comprise, for instance, Lithium tetrafluoroborate ($LiBF_4$), Lithium Bis(oxalato)borate (LiBOB), Lithium hexafluorophosphate ($LiPF_6$), Lithium DiFluorooxalotoborate (LiDFOB), Lithium bistrifluoromethanesulfonimidate (LiTFSI) or any combination thereof. Other lithium salts are possible according to the invention. A lithium salt may be included at a concentration greater than 0.1 M and more preferably, greater than 0.2 M and more preferably greater than 0.4 M and more preferably greater than 0.6 M and more preferably greater than 0.8 M and more preferably greater than 0.9 M and most preferably greater than or equal to 1.0 M. In certain embodiments, the concentration may be greater than 1.1 M, greater than 1.2 M, greater than 1.4 M or greater than 1.5 M. The lithium salt may be included at a concentration less than 2.5 M and more preferably, less than 2.2 M and more preferably less than 2.0 M and more preferably less than 1.9 M and more preferably less than 1.8 M and more preferably less than 1.7 M and more preferably less than 1.6 M and more preferably less than 1.5 M and more preferably less than 1.4 M and more preferably less than 1.3 M and most preferably less than or equal to 1.2 M. In certain embodiments, the concentration of lithium salt may be less than 1.1 M, less than 1.0 M, less than 0.8 M or less than 0.5 M. Any combination of the upper and lower limits, wherein the upper limit is equal to or above the lower limit, is possible according to the invention. Other concentrations are possible according to the invention.

According to one embodiment of the invention, the electrolyte may comprise a solvent that may comprise a mixture of two or more carbonates. At least one of the two or more carbonates may be ethylene carbonate, propylene carbonate, fluoroethylene carbonate (FEC), and/or dimethyl carbonate. According to one embodiment of the invention, the electrolyte may comprise a solvent that may comprise a mixture of ethylene carbonate and/or propylene carbonate and/or dimethyl carbonate. According to one embodiment of the invention, the electrolyte may comprise a solvent that may comprise a mixture of fluoroethylene carbonate (FEC) and/or succinonitrile and/or dimethyl carbonate.

The electrolyte may also comprise one or more nitriles, employed either as an electrolyte additive or as a co-solvent. An electrolyte additive is here defined as an electrolyte constituent whose presence is not greater than 5 mass precent, while a co-solvent is here defined as an electrolyte constituent whose presence is greater than 5 mass precent. A preferred electrolyte nitrile-type additive or a nitrile co-solvent is succinonitrile. Other nitrile-type additives or nitrile co-solvents are possible according to the invention.

The electrolyte may also comprise the simultaneous presence of various additives. One of the additives may be a carbonate-type additive (carbonate additive). One of the additives may be a nitrile-type additive (nitrile additive). Examples of additive types include but are not limited to carbonate-type additives and/or nitrile-type additives. A specific carbonate-type additive may include but is not limited to fluoroethylene carbonate (FEC). Specific nitrile-type additives may include, but are not limited to, acrylonitrile, succinonitrile, propanenitrile, aminopropionitrile, malononitrile, pivalonitrile, acetone cyanohydrin, butyronitrile, tetramethylsuccinonitrile and/or glutaronitrile. Other additives, including other types of carbonate and/or nitrile additives, are possible according to the invention. At least one of the additives may comprise a non-ionic organic additive. A first additive may comprise a non-ionic organic additive. A second additive may comprise a nitrile-type additive. The non-ionic organic additive may comprise a cyclic carbonate-based additive (a cyclic carbonate additive) or dioxolane. The cyclic carbonate-type additive may comprise 1,3-cyclic carbonate, chloroethylene carbonate, and/or fluoroethylene carbonate (FEC) or any combination thereof. At least one of the additives may comprise a nitrile-type additive. At least one of the nitrile-type additives may be acetonitrile, adiponitrile, glutaronitrile, pimelonitrile, malononitrile (MLN) and/or a succinonitrile (SCN) or any combination thereof.

Here a cyclic carbonate means a carbonate ester or a molecule where the R1 and

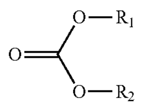

R2 below are not independent chains, but form a ring. Examples of cyclic carbonates include, but are not limited to EC. According to certain embodiments of the invention, an additive may also be a solvent and/or a solvent may also be an additive.

The electrolyte may comprise a lithium salt. In one embodiment, LiDFOB is used as a lithium salt. The concentration of LiDFOB may be may be at a concentration greater than 0.1 M and more preferably, greater than 0.2 M and more preferably greater than 0.4 M and more preferably greater than 0.6 M and more preferably greater than 0.8 M and more preferably greater than 0.9 M and most preferably greater than or equal to 1.0 M. In certain embodiments, the concentration may be greater than 1.1 M, greater than 1.2 M, greater than 1.4 M or greater than 1.5 M. The lithium salt may be included at a concentration less than 3.0 M and more preferably, less than 2.5 M and more preferably less than 2.2 M and more preferably less than 2.0 M and more preferably less than 1.9 M and more preferably less than 1.8 M and more preferably less than 1.7 M and most preferably less than 1.5 M. In certain embodiments, the concentration may be less than 1.4 M, less than 1.3 M, less than 1.2 M, less than 1.1 M, or less than 1.0 M. Any combination of the upper and lower limits is possible according to the invention. Other concentrations are possible according to the invention. For instance the concentration may be between 0.5 M and 2.5 M and more preferably between 0.8 M and 2.0 M and more preferably between 0.9 and 1.7 M and more preferably between about 1.0 M and about 1.5 M and more preferably between about 1.1 M and 1.3 M and most preferably approximately 1.2 M concentration.

In a one embodiment, the invention pertains to an electrolyte for a lithium based battery, e.g., a lithium battery or a lithium-ion battery. The electrolyte of the lithium based battery may comprise $LiPF_6$, LiDFOB, $LiBF_4$, LiBOB, LiTFSI or any combination thereof. The concentration of $LiPF_6$, $LiBF_4$, LiDFOB, LiBOB, LiTFSI or combinations thereof may be greater than 0.1 M and more preferably, greater than 0.2 M and more preferably greater than 0.4 M and more preferably greater than 0.6 M and more preferably greater than 0.8 M and more preferably greater than 0.9 M and most preferably greater than or equal to 1.0 M. In certain embodiments, the concentration may be greater than 1.1 M, greater than 1.2 M, greater than 1.4 M or greater than 1.5 M. The $LiPF_6$, LiDFOB, $LiBF_4$, LiBOB, LiTFSI or combinations thereof may be included at a concentration less than 3.0 M and more preferably, less than 2.5 M and more preferably, less than 2.2 M and more preferably less than 2.0 M and more preferably less than 1.9 M and more preferably less than 1.8 M and more preferably less than 1.7 M and more preferably less than 1.6 M and more preferably less than 1.5 M and more preferably less than 1.4 M and more preferably less than 1.3 M and most preferably less than or equal to 1.2 M. In certain embodiments, the concentration of $LiPF_6$, LiDFOB, $LiBF_4$, LiBOB, LiTFSI or combinations thereof may be less than 1.1 M, less than 1.0 M, less than 0.8 M or less than 0.5 M. For instance the concentration may be between 0.5 M and 2.0 M and more preferably between 0.8 M and 1.6 M and more preferably between 0.9 and 1.3 M and most preferably from about 1.0 M to about 1.2 M. The $LiPF_6$, LiDFOB, $LiBF_4$, LiBOB, LiTFSI or combinations thereof may be included at a concentration less than 3.0 M and more preferably, less than 2.5 M and more preferably less than 2.2 M and more preferably less than 2.0 M and more preferably less than 1.9 M and more preferably less than 1.8 M and more preferably less than 1.7 M and most preferably less than 1.5 M. In certain embodiments, the concentration may be less than 1.4 M, less than 1.3 M, less than 1.2 M, less than 1.1 M, or less than 1.0 M. Any combination of the upper and lower limits is possible according to the invention. Other concentrations are possible according to the invention. For instance the concentration may be between 0.5 M and 2.5 M and more preferably between 0.8 M and 2.0 M and more preferably between 0.9 and 1.7 M and most preferably between about 1.0 M and about 1.5 M. Any combination of the upper and lower limits, wherein the upper limit is greater than or equal to the lower limit, is possible according to the invention. Other concentrations are possible according to the invention.

In a preferred embodiment, the electrolyte salts may not comprise $LiPF_6$. In another preferred embodiment the electrolyte salt may comprise a combination of two or more of LiDFOB, $LiBF_4$, $LiPF_6$, LiBOB and LiTFSI salts. In another preferred embodiment, the electrolyte may comprise LiDFOB and one or more of $LiPF_6$, $LiBF_4$, LiBOB and LiTFSI. LiDFOB may be a primary lithium salt. LiDFOB, $LiBF_4$, $LiPF_6$, LiBOB and LiTFSI may be secondary lithium salts.

The electrolyte may comprise a solvent mixture. The solvent mixture may comprise at least two carbonate-type solvents. At least one of the carbonate-type solvents (carbonate solvents) may be an ethylene carbonate (EC). At least one of the carbonate solvents may be a dimethyl carbonate (DMC). At least one of the carbonate solvents may be propylene carbonate (PC). The electrolyte of the lithium based battery according to one embodiment of the invention may comprise a solvent consisting of one or more carbonates and one or more nitriles. The one or more carbonates may be ethylene carbonate (EC), propylene carbonate (PC) and/or dimethyl carbonate (DMC). The one or more nitriles may be succinonitriles. The electrolyte of the lithium based battery may comprise one or more additives. In the case that EC and DMC are present in the electrolyte, the mass ratio of EC to DMC may be from about 1:1 to 3:7. In the case that EC, PC and DMC are present in the electrolyte, the solvent may generally have a mass ratio of EC to PC to DMC of about 1:1:1 to about 1:10:10.

It has been surprisingly found that a mixture comprising multiple carbonate-type solvents exhibit synergistic effects: e.g., in the EC:DMC solvent, DMC has a low viscosity although the salt solubility is poor. EC has high viscosity although the salt solubility is excellent. Blend of EC:DMC has low viscosity with excellent salt solubility. Additional advantages of electrolytes comprising a mixture of carbonate type solvents include extended operating temperature and higher ionic conductivity.

There may be any number of carbonate solvents in the electrolyte according to the invention. There may be one or more minor carbonate solvents and one major carbonate solvent. The mass fraction of the one or more minor carbonate solvents may be preferably less than 0.5 and more preferably less than 0.45 and most preferably less than or equal to 0.4. In some embodiments of the invention, the mass fraction of the one or more minor carbonate solvents may be less than 0.35, less than 0.3, less than 0.25, less than 0.20, less than 0.15 or less than 0.1. The mass fraction of the major carbonate solvent may be preferably greater than 0.5 and more preferably greater than 0.55 and more preferably greater than or equal to 0.6. In some embodiments of the invention, the mass fraction of the one or more minor carbonate solvents may be greater than 0.65, greater than 0.7, less than 0.75, greater than 0.80, greater than 0.85 or greater than 0.9.

In one embodiment, the electrolyte comprises at solvent mixture comprising at least two carbonate-type solvents. In certain embodiments, the mass ratio of the minor solvent to the major solvent in the solvent mixture may be approximately 1:9, or approximately 1.5:8.5, or approximately 2:8, or approximately 2.5:7.5, or approximately 3:7, or approximately 3.5:6.5, or approximately 4:6, or approximately 4.5:5.5, or approximately 1:1. In certain embodiments, the mass ratio of the minor solvent to the major solvent in the solvent mixture may be approximately 1:9 to 1:1, or approximately 2:8 to 1:1, or approximately 3:7 to 1:1, or approximately 4:6 to 1:1.

In one embodiment of the invention, there may be two carbonate solvents, "x" and "y", in the electrolyte, where the mass proportion of said two carbonate solvents are "$u_x$" and "$u_y$", respectively. $u_y$ may be $1-u_x$. x may be the minor carbonate solvent and y may be the major carbonate solvent. The mass proportion, $u_x$, i.e. u of minor carbonate solvent x in the solvent, may be in between lower value a and upper value b or equal to either. a may be preferably greater than 0.01, and more preferably greater than 0.02, and more preferably greater than 0.04, and more preferably greater than 0.07, and more preferably greater than 0.11, and more preferably greater than 0.16, and more preferably greater than 0.20, and more preferably greater than 0.23, and more preferably greater than 0.25, and more preferably greater than 0.26, and more preferably greater than 0.27 and more preferably greater than 0.28 and more preferably greater than 0.29, and most preferably 0.3. b may be preferably less than 0.5, and more preferably less than 0.45, and more preferably less than 0.41, and more preferably less than 0.38, and more preferably less than 0.36, and more preferably less than 0.35, and more preferably less than 0.34, and more preferably less than 0.33, and more preferably greater than 0.32, and more preferably less than 0.31 and most preferably 0.3. In one embodiment of the invention, the minor carbonate, x, may comprise, for instance, an ethylene carbonate (EC) and/or a propylene carbonate (PC) or any combination thereof, and the major carbonate, y, may comprise, for instance, a dimethyl carbonate (DMC). Other major and minor carbonates are possible according to the invention. Other mass proportions of major and minor carbonates are possible according to the invention.

According to one embodiment of the invention, there may be three carbonate solvents, "X", "Y" and "Z", in the electrolyte. The mass proportion between said three carbonate solvents may be "$U_x$", "$U_y$" and "$U_z$", respectively, wherein the sum of "$U_x$", "$U_y$" and "$U_z$" is one. X and Y may be minor carbonate solvents. Z may be a major carbonate solvent. The mass proportion, $U_x$, of minor carbonate solvent X may be between lower value $A_x$ and upper value $B_x$ or equal to either. The mass proportion, V, of minor carbonate solvent Y may be between lower value $A_y$ and upper value $B_y$ or equal to either. The mass proportion, $U_z$, of major carbonate solvent Z may be between lower value $A_z$ and upper value $B_z$ or equal to either. $A_x$ and/or $A_y$ may be preferably greater than 0.01, and more preferably greater than 0.02, and more preferably greater than 0.04 and more preferably greater than 0.07 and more preferably greater than 0.11, and more preferably greater than 0.14, and more preferably greater than 0.16, and more preferably greater than 0.17, and more preferably greater than 0.18, and more preferably greater than 0.19 and most preferably 0.2. $B_x$ and/or $B_y$ may be preferably less than 0.33, and more preferably less than 0.3, and more preferably less than 0.28 and more preferably less than 0.27 and more preferably less than 0.26, and more preferably less than 0.25, and more preferably less than 0.24, and more preferably less than 0.23, and more preferably less than 0.22, and more preferably less than 0.21 and most preferably 0.2. $A_x$, $A_y$, $B_x$ and $B_y$ may all have different values. $A_x$ may be greater than, less than or equal to $B_x$ and/or $B_y$. $A_y$ may be greater than, less than or equal to $B_x$ and/or $B_y$. $A_z$ may be preferably greater than 0.37, and more preferably greater than 0.40, and more preferably greater than 0.42 and more preferably greater than 0.44 and more preferably greater than 0.45, and more preferably greater than 0.46, and more preferably greater than 0.47, and more preferably greater than 0.48, and more preferably greater than 0.49, and more preferably greater than 0.50, and more preferably greater than 0.51, and more preferably greater than 0.52 and more preferably greater than 0.53 and more preferably greater than 0.54, and more preferably greater than 0.55, and more preferably greater than 0.56, and more preferably greater than 0.57, and more preferably greater than 0.58, and more preferably greater than 0.59 and most preferably approximately 0.6. $B_z$ may be preferably less than 0.98, and more preferably less than 0.95, and more preferably less than 0.90 and more preferably less than 0.85 and more preferably less than 0.80, and more preferably less than 0.75, and more preferably less than 0.70, and more preferably less than 0.68, and more preferably less than 0.66, and more preferably less than 0.65, and more preferably less than 0.64, and more preferably less than 0.63, and more preferably less than 0.62, and more preferably less than 0.61 and most preferably approximately 0.60.

According to one embodiment of the invention, minor carbonate solvent X may be Ethylene Carbonate (EC). According to one embodiment of the invention, minor carbonate solvent Y may be Propylene Carbonate (PC). According to one A embodiment of the invention, major carbonate solvent Z may be Dimethyl carbonate. According to one embodiment, the mass ratio of carbonate solvents X, Y and Z in the electrolyte is $U_x$:$U_y$:$U_z$, in the respective order, where X is the Ethylene Carbonate (EC) mass proportion, Y is the Propylene Carbonate (PC) mass proportion and Z is the Dimethyl Carbonate (DC) mass proportion. $U_x$, $U_y$, and $U_z$ may take any positive number.

The electrolyte may comprise one, two or more electrolyte additives. The mass percent of any individual electrolyte additive may be above 0.1, and more preferably above 0.2, and more preferably above 0.4, and more preferably above 0.7, and more preferably above 1.1, and more preferably above 1.4, and more preferably above 1.6, and more preferably above 1.7, and more preferably above 1.8 and more preferably above 1.9, and most preferably 2 mass percent of the total electrolyte. The amount of any individual electrolyte additive may be below 5.0, and more preferably below 4.0, and more preferably below 3.4, and more preferably below 3.0, and more preferably below 2.8, and more preferably below 2.6, and more preferably below 2.4, and more preferably below 2.3, and more preferably below 2.2 and more preferably below 2.1, and most preferably 2 mass percent of the total electrolyte. The amount of any individual electrolyte additive may be between any of said lower mass percent and any of said upper mass percent.

A first electrolyte additive may be a non-ionic organic additive. A second electrolyte additive may be a nitrile-type additive. The electrolyte additives may amount to a mass percent of the electrolyte of greater than 0.01% and more preferably, greater than 0.02% and more preferably greater than 0.04% and more preferably greater than 0.06% and more preferably greater than 0.08% and more preferably greater than 0.09% and most preferably greater than or equal to 0.1%. In certain embodiments, the concentration may be greater than 0.11%, greater than 0.12%, greater than 0.14% or greater than 0.15%. The electrolyte additives may amount to a mass percent of the electrolyte of less than 15% and more preferably, less than 12% and more preferably less than 10% and more preferably less than 9% and more preferably less than 8% and more preferably less than 7% and more preferably less than 6% and most preferably less than 5%. In certain embodiments, the concentration of electrolyte additives may be less than 4%, less than 3%, less than 2% M or less than 1%. Any combination of the upper and lower limits is possible according to the invention. Other mass percentages are possible according to the invention. For instance, the concentration may be between 0.05% and 10% and more preferably between 0.08% and 8% M and more preferably between 0.09% and 6% and most preferably between about 0.1% and about 5%.

In one embodiment, one or more of the electrolyte additives may be one or more non-ionic organic additives. In one embodiment, a non-ionic additive may be fluoroethylene carbonate. Other non-ionic additives are possible according to the invention. The mass percentage of the one or more non-ionic additives may be greater than 0.05%, and more preferably greater than 0.01%, and more preferably greater than 0.02% and more preferably greater than 0.04%, and more preferably greater than 0.08%, and more preferably greater than 0.1%, and more preferably greater than 0.15%, and more preferably above 0.2%, and more preferably greater than 0.3% and more preferably above 0.5% and more preferably greater than 0.6%, and more preferably above 0.7%, and more preferably above 1% and more preferably greater than 1.2% and more preferably above 1.3% and more preferably greater than 1.5% and more preferably greater than 1.7% and more preferably greater than 1.8% and most preferably greater than 1.9% and most preferably 2% of the total mass of electrolyte. In certain embodiments, the concentration may be greater than 2%, greater than 2.5%, greater than 3% or greater than 5%. The additives may amount to a mass percent of the electrolyte of less than 10% and more preferably, less than 7% and more preferably less than 5%, and more preferably less than 4.5%, and more preferably less than 4%, and more preferably below 3.6%, and more preferably less than 3.3%, and more preferably less than 3%, and more preferably below 2.7%, and more preferably less than 2.5% and more preferably less than 2.3% and more preferably less than 2.2% and most preferably less than 2.1% and most preferably 2% of the total mass of electrolyte. In certain embodiments, the concentration may be less than 2%, less than 1.5%, less than 1% or less than 0.5%. Any combination of the upper and lower limits is possible according to the invention. Other mass percentages of non-organic additives are possible according to the invention. For instance the concentration may be between 0.05% and 10% and more preferably between 0.1% and 5% and more preferably between 0.5% and 4% and more preferably between about 1% and about 3% and more preferably between about 1.5% and about 2.5% and more preferably between about 1.8% and about 2.2% and about 2.5% and more preferably between about 1.9% and about 2.1% and most preferably about 2%. The mass proportions of the organic additive may be between any of said lower mass percent and any of said upper mass percent, wherein the upper limit is greater than or equal to the lower limit.

In one embodiment, an additive may be a nitrile-type additive. The nitrile-type additive may be a second electrolyte additive. The nitrile-type additive may be succinonitrile (SCN). The mass percentage a second electrolyte additive of the total mass of electrolyte may be greater than 0.05% and more preferably greater than 0.01% and more preferably, greater than 0.02% and more preferably greater than 0.04% and more preferably greater than 0.08% and more preferably greater than 0.15% and more preferably greater than 0.3% and more preferably greater than 0.6% and more preferably greater than 1.2% and more preferably greater than 1.5% and more preferably greater than 1.7% and more preferably greater than 1.8% and most preferably greater than 1.9%. In certain embodiments, the concentration may be greater than 2%, greater than 2.5%, greater than 3% or greater than 5%. The second additives may amount to a mass percent of the electrolyte of less than 10% and more preferably, less than 7% and more preferably less than 5% and more preferably less than 4% and more preferably less than 3% and more preferably less than 2.5% and more preferably less than 2.3% and more preferably less than 2.2% and most preferably less than 2.1%. In certain embodiments, the concentration may be less than 2%, less than 1.5%, less than 1% or less than 0.5%. Any combination of the upper and lower limits is possible according to the invention. Other mass percentages are possible according to the invention. For instance the concentration may be between 0.05% and 10% and more preferably between 0.1% and 5% and more preferably between 0.5% and 4% and more preferably between about 1% and about 3% and more preferably between about 1.5% and about 2.5% and more preferably between about 1.8% and about 2.2% and about 2.5% and more preferably between about 1.9% and about 2.1% and most preferably about 2%.

The nitrile-type additive may be succinonitrile. The mass proportions of the nitrile-type additive may be above 0.1%, and more preferably above 0.2%, and more preferably above 0.3% and more preferably above 0.4%, and more preferably above 0.5%, and more preferably above 0.6%, and more preferably and most preferably 1% of the total mass of electrolyte. The mass proportions of the organic additive may be below 3%, and more preferably below 2.5%, and more preferably below 2.1% and more preferably below 1.8%, and more preferably below 1.6%, and more preferably below 1.5%, and more preferably below 1.4% and more preferably below 1.3% and more preferably below 1.2% and more preferably below 1.1% and most preferably 1% of the total mass of electrolyte. The mass proportions of the nitrile-type additive may be between any of said lower mass percent and any of said upper mass percent.

It has been surprisingly found that succinonitrile (SCN) may be used as a co-solvent. SCN may be used together with one or more carbonate based co-solvents. The one or more carbonate based co-solvents may have the ability to form a solid electrolyte interphase (SEI). Preferably, the carbonate based co-solvents may comprise a mixture of DMC and FEC. FEC may have the ability to form an SEI. Preferably, succinonitrile co-solvent is present to preferably at least 5%, and more preferably at least 10% and more preferably at least 15% and most preferably at least 20% ratio in the electrolyte. Preferably FEC co-solvent is present to at least 1% and more preferably at least 4% and more preferably at least 6% and more preferably at least 8% and most preferably at least 10% ratio in the electrolyte. This said solvent mixture is preferably used with LiDFOB-containing electrolyte salt. As shown in the examples, such Li-ion electrolyte outperforms current state-of-the-art electrolytes in terms of cycling stability, which proves its industrial usefulness.

It has further been surprisingly found that succinonitrile and FEC may be successfully used together as electrolyte additives. Said additives may be added into an appropriately selected solvent mixture. In one embodiment, the solvent mixture comprises EC, PC, and DMC solvents. It has been surprisingly found that this combination improves the ionic conductivity of the electrolyte. It has also been surprisingly found that simultaneous presence of EC, PC, and DMC is synergistic with the use of succinonitrile and FEC additives. The resulting electrolyte has been found to outperform current state-of-the-art electrolytes in terms of cycling stability. Cycling stability is a key aspect of industrial usefulness. This said solvent mixture is preferably used with LiDFOB-containing electrolyte salt, though other lithium salts are possible according to the invention. The cycling stability of an exemplary embodiment is described in the examples.

The above stated discoveries were investigated through the use of a single type of electrolyte salt, namely LiDFOB. Here LiDFOB was the primary lithium salt. Other primary lithium salts are possible according to the invention. LiDFOB, $LiBF_4$, $LiPF_6$, LiBOB and LiTFSI may be a primary lithium salt according to the invention. It has also been surprisingly found that adding other lithium salts, here termed secondary lithium salts, to the electrolyte may improve the electrolyte, and therefore, the overall electrochemical cell, performance. Secondary lithium salts may include any salt containing lithium. Examples of secondary lithium salts include, but are not limited to, LiDFOB, $LiBF_4$, $LiPF_6$, LiBOB and LiTFSI. Other lithium-containing salts are possible according to the invention. Preferable secondary lithium salts are boron containing lithium salts. Examples of boron containing lithium salts include, but are not limited to LiDFOB, $LiBF_4$ and LiBOB. In one embodiment of the invention, the electrolyte comprises a primary lithium salt and a boron-containing secondary lithium salt.

Here, a primary lithium salt means a lithium salt which may comprise greater than or equal to 50% of the lithium salt in the electrolyte and more preferably, greater than 65%, and more preferably greater than 75%, and more preferably greater than 80%, and more preferably greater than 85% and more preferably greater than 87% and most preferably greater than 89% of the lithium salt in the electrolyte. In certain embodiments, the primary lithium salt may comprise approximately 90% of the lithium salt in the electrolyte. In certain embodiments, the primary lithium salt may comprise greater than 91% of the lithium salt in the electrolyte. In certain embodiments, the primary lithium salt may comprise greater than 92% of the lithium salt in the electrolyte. In certain embodiments, the primary lithium salt may comprise greater than 95% of the lithium salt in the electrolyte. In certain embodiments, the primary lithium salt may comprise greater than 98% of the lithium salt in the electrolyte. In certain embodiments, the primary lithium salt may comprise 100% of the lithium salt in the electrolyte.

Here, a secondary lithium salt means a lithium salt which may comprise less than 50% of the lithium salt in the electrolyte and more preferably, less than 35%, and more preferably less than 25%, and more preferably less than 20%, and more preferably less than 15%, and more preferably less than 13% and most preferably less than 11% of the lithium salt in the electrolyte. In certain embodiments, the primary lithium salt may comprise approximately 10% of the lithium salt in the electrolyte. In certain embodiments, the primary lithium salt may comprise less than 9% of the lithium salt in the electrolyte. In certain embodiments, the primary lithium salt may comprise less than 5% of the lithium salt in the electrolyte. In certain embodiments, the primary lithium salt may comprise less than 2% of the lithium salt in the electrolyte. In certain embodiments, the primary lithium salt may comprise less than 1% of the lithium salt in the electrolyte. There may be one or more secondary lithium salts according to the invention.

In one preferred embodiment of the invention, $LiBF_4$ and/or LiBOB salts may be secondary lithium salts and LiDFOB may be a primary lithium salt. Said combinations have been found to further improves the electrolyte performance. Preferably, the LiDFOB comprises at least 70 mass % of the electrolyte salts, and more preferably the LiDFOB comprises at least 80 mass % of the electrolyte salts, and most preferably the LiDFOB comprises at least 90 mass % of the electrolyte salts. The herein disclosed salt mixture has been found to improve the battery cycling stability in comparison with the use of pure LiDFOB electrolyte salt. This electrolyte salt may be used in conjunction with the above disclosed electrolyte solvents.

In certain embodiments, the absence of $LiPF_6$ electrolyte salt has been found to improve stable cycling performance at elevated operating temperatures.

Figure 1B:
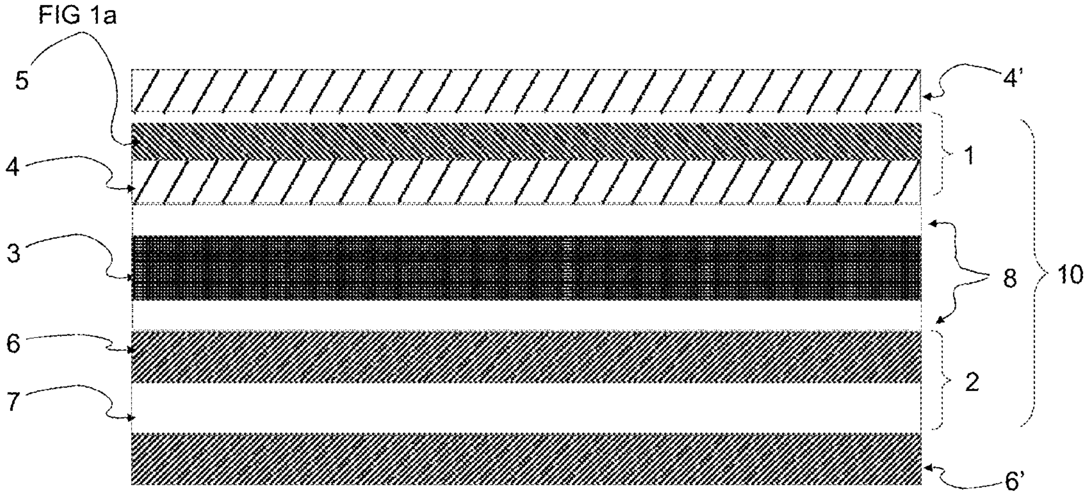
Figure 1C:
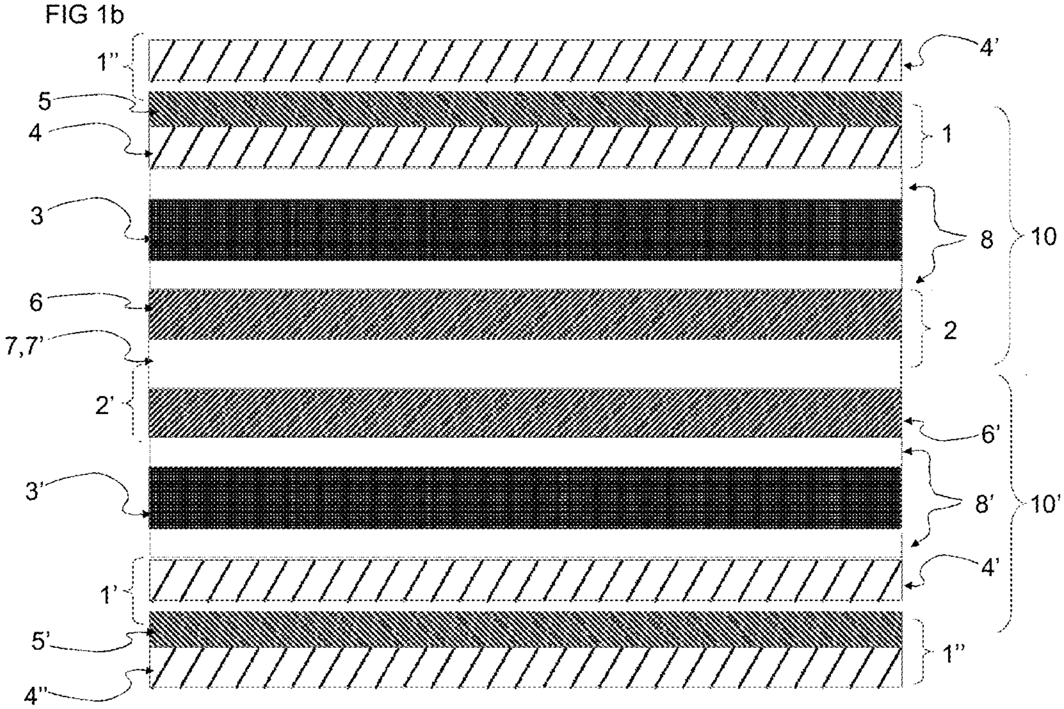

An electrochemical cell according to the invention may include one or more electrolyte according to the invention. The electrochemical cell may be a lithium based electrochemical cell. Examples of lithium based electrochemical cells include such as lithium cells and/or lithium ion cells. The electrochemical cell may comprise an electrochemical cell stack. An electrochemical cell stack according to the invention is shown in FIG. 1. The cell stack may comprise a separator 3, which may separate the positive electrode 1 from the negative electrode 2. Separator 3 may include any film-like material having been generally used for forming separators. Separator 3 may include any film-like material having been generally used for forming of non-aqueous electrolyte secondary batteries. Separator 3 may include any film-like material having been generally used for forming separators of the type presented herein. Examples of suitable separators include, but are not limited to, for example, microporous polymer film made from polypropylene, polyethylene, or a layered combination of the two. A separator, for example a microporous separator, may be made of polyolefin or cellulose material. A separator may be coated with a surface modifying material. The surface modifying material may be a protective material. The surface modifying material may be a surface energy modifying material. Examples of a separator coating materials include, but are not limited to, oxides and nitrides. Examples of oxides include aluminum oxide. Other separator materials and surface modifying materials are possible according to the invention.

The electrolyte may be solid, liquid, gel or in another physical state. The electrolyte may be of the type described herein. If a solid electrolyte 8 or gel electrolyte 6 is used as the electrolyte 8 of the battery cell stack 10, the separator 3 does not necessarily need to be provided. The separator 3 thickness may be of any thickness, according to the invention.

The separator may be, for instance, anywhere between 0.5 μm and 1000 μm, and more preferably, between 1 μm and 500 μm, and more preferably 2 and 250 μm and more preferably between 4 μm and 125 μm and more preferably between 8 μm and 60 μm and most preferably between 9 and 30 μm and most preferably about 25 μm, but separator thicknesses outside this range are possible according to the invention.

Positive electrode material 4 is typically produced by mixing the cathode active material with one or more binder and/or one or more conductive additives. The wt % of active material may be of any value greater than 0% and less than 100% and more preferably between 50% and 98% and more preferably between 75% and 96% and more preferably between 87% and 90% and most preferably about 89 wt %. The wt % of conductive agent may be anywhere between 0% and 100% and more preferably between 1% and 50% and more preferably between 2% and 25% and more preferably between 4% and 13% and most preferably between 6% and 9% and most preferably about 7 wt %. Examples of conductive additives include but are not limited to acetylene black. The wt % of binder may be any value between 0% and 100% and more preferably between 0.5% and 50% and more preferably between 1% and 25% and more preferably 2% and 12% and more preferably between 3% and 6% and most preferably about 4 wt %. Examples of binders according to the invention include but are not limited to PVDF.

The cathode material mix may be dispersed, for instance, in a solvent. Examples of solvents according to the invention include, but is not limited to, N-methyl-2-pyrrolidone (NMP). The mix may be made into, for instance, a slurry, paste, solution or suspension. This mix may then be applied to one or both surfaces of a cathodic current collector 5 to create a cathode with cathode material on one side 4 or cathode material 4 and 4' on both sides of the cathodic current collector. The cathodic current collector may be made from any appropriate material. Cathodic current collector 5 may be made from a conductive material. The conductive material may comprise a metal or alloy. The metal or alloy may comprise aluminum. The cathodic current collector 5 may be aluminum. The cathodic current collector may be a mesh or solid or perforated metal or metal alloy foil. The metal foil may be an aluminum foil. Other metals and metal or metal alloy foils are possible according to the invention. The cathodic current collector may have any thickness according to the invention. Preferably the thickness may be between 1 μm and 500 μm and more preferably between 2 μm and 250 μm and more preferably between 4 and 125 μm and more preferably between 8 and 62 μm and more preferably between 10 and 31 μm and more preferably between 12 and 20 μm and most preferably approximately 15 μm.

The mix may be dried at any appropriate temperature. Preferably the mix drying temperature may be between 50 and 200° C. and more preferably between 100-150° C. The dried positive electrode 1 may then be compressed. The compressing may be done in, for instance a press or a calendar. The calender may be, for instance, a roll press. The compression may be used to obtain a compressed positive electrode 1.

The negative electrode material 6 may be prepared by any means known in the art. Preferably, the material may be prepared by mixing a anode active material with one or more conductive materials and/or one or more binders. The wt % of anode active material can be greater than 0% up to 100% and more preferably between 50% and 98% and more preferably between 75% and 97% and more preferably between 75% and 95% and more preferably between 87% and 94% and more preferably between 91% and 93% and most preferably about 92 wt %. The anode active material may be any appropriate material including but not limited to graphite. The wt % of conductive material may be an value below 100%, preferably between 0.1% and 50% and more preferably between 0.2% and 25% and more preferably between 0.4% and 12% and more preferably between 0.8% and 6% and more preferably between 1.5% and 5% and more preferably 2% and 4% and most preferably about 3 wt %. The conductive material may comprise, e.g., carbon. Examples of carbon containing conductive materials include but are not limited to acetylene black. The wt % of binder may be an value below 100%, preferably between 0.1% and 50% and more preferably between 0.2% and 25% and more preferably between 0.4% and 12% and more preferably between 0.8% and 10% and more preferably between 1.6% and 8% and more preferably 3.2% and 7% and most preferably between 4% and 6% and most preferably about 5 wt %. Examples of binders include, but are not limited to, CMC+SBR. The negative electrode 2 may be prepared from this mix in a process similar to that described above for positive electrode 1. This mix may then be applied to one or both surfaces of a anodic current collector 7 to create an anode with anode material on one side 6 or anode material 6 and 6' on both sides of the anodic current collector.

The anodic current collector 7 may be made from any appropriate material. The anodic current collector 7 may be made from a conductive material. The conductive material may comprise a metal or alloy. The metal or alloy may comprise copper. The anodic current collector 5 may be essentially pure copper. The cathodic current collector may be a mesh or solid or perforated metal or metal alloy foil. The metal foil may be a copper foil. The anodic current collector may have any thickness according to the invention. Preferably the thickness may be between 1 μm and 500 μm and more preferably between 2 μm and 200 μm and more preferably between 4 and 100 μm and more preferably between 8 and 50 μm and more preferably between 9 and 25 μm and more preferably between 10 and 15 μm and most preferably approximately 12 μm.

Separator 3 may separate the positive electrode 1 from the negative electrode 2. Separator 3 may be a microporous polymer film. The film may be made from polypropylene, polyethylene, or a layered combination of the two. A microporous separator made of polyolefin or cellulose material can in certain cases also be used. Other separator materials are possible according to the invention. If a solid electrolyte 8 or gel electrolyte 6 is used as the electrolyte 8 of the battery cell stack 10, the separator 3 does not necessarily need to be provided. Separator 3 thickness is preferably between 9 and 25 μm, but separator thicknesses outside this range are possible according to the invention.

The negative electrode 2 and positive electrode 1 and a separator 3, may be laminated and spirally wound to produce a spiral type "jelly roll" element. Preferably this jelly roll may have an oblong shape. One or more positive lead current carrying tabs may be attached to the positive current collector and then welded to the battery top. A vent may also be available, for example, at the top of the battery. A negative lead may be made of any appropriate material. The negative lead material may be conductive. The conductive material may be a metal or alloy. The metal or alloy may comprise nickel. The metal may be nickel metal. The "jelly roll" may be inserted in a battery can. The negative lead may connect the negative current collector to the bottom of the battery can. The Electrolyte 6 may be filled by any means. The filling may be vacuum filling. The battery cell may be sealed. The sealing may be by any means. The sealing may be via an insulating seal gasket. A safety valve, current interrupt device, and a PTC device may also be present at the battery to enhance safety.

EXAMPLES

Reference will now be made in detail to various embodiments.

The description below discloses some embodiments in such a detail that a person skilled in the art is able to utilize the embodiments based on the disclosure. Not all steps or features of the embodiments are discussed in detail, as many of the steps or features will be obvious for the person skilled in the art based on this specification.

For evaluation of various Li-ion electrolytes according to the invention, 18650 format cylindrical prototype lithium-ion secondary battery cells, having an outer diameter of 18 mm and a height of 65 mm, were assembled and tested. The unit battery cell stack 10 is described in FIG. 1. The separator 3 was a microporous polymer film made from polypropylene, polyethylene, or a layered combination of the two. In the examples, separator 3 thickness is typically between 9 and 25 μm, but separator thicknesses outside this range are possible according to the invention.

In the examples, positive electrode material 4 was typically produced by mixing the cathode material at about 89 wt % together with about 7 wt % of a conductive agent (e.g. acetylene black), and about 4 wt % of a binder (e.g., PVDF). The mix was dispersed in a solvent (e.g., N-methyl-2-pyrrolidone (NMP)), in order to prepare a slurry. This slurry was then applied to one or both surfaces of an aluminum current collector 5, which may be, for instance, a metal foil. The foil typically has a thickness of about 15 μm. The slurry may be dried at about 100-150° C. The dried positive electrode 1 was then calendared by a roll press, to obtain a compressed positive electrode 1. The negative electrode material 6 was typically prepared by mixing about 92 wt % of graphite as a negative active material, about 3 wt % of conductive carbon (e.g. acetylene black), and about 5 wt % of a binder (CMC+SBR). The negative electrode 2 was then prepared from this mix in a process similar to that described above for positive electrode 1 except that a copper current collector foil 7, typically of 10-15 μm thickness, was used. The negative electrode 2 and positive electrode 1 and a separator 3 formed of a polymer film (e.g., polyethylene) with micropores, of thickness about 25 μm, were laminated and spirally wound to produce a spiral type electrode element. Preferably this roll has an oblong shape. A positive lead current carrying tabs was attached to the positive current collector and then welded to the battery top. A negative lead, made of nickel metal, was connected the negative current collector to the bottom of the battery can. Electrolyte was filled in the battery can having the spirally wound "jelly roll", and the battery cell was then sealed via an insulating seal gasket.

Example 1) 1.1M LIDFOB in EC:PC:DMC 1:1:3 1% SCN 2% FEC

Figure 2:
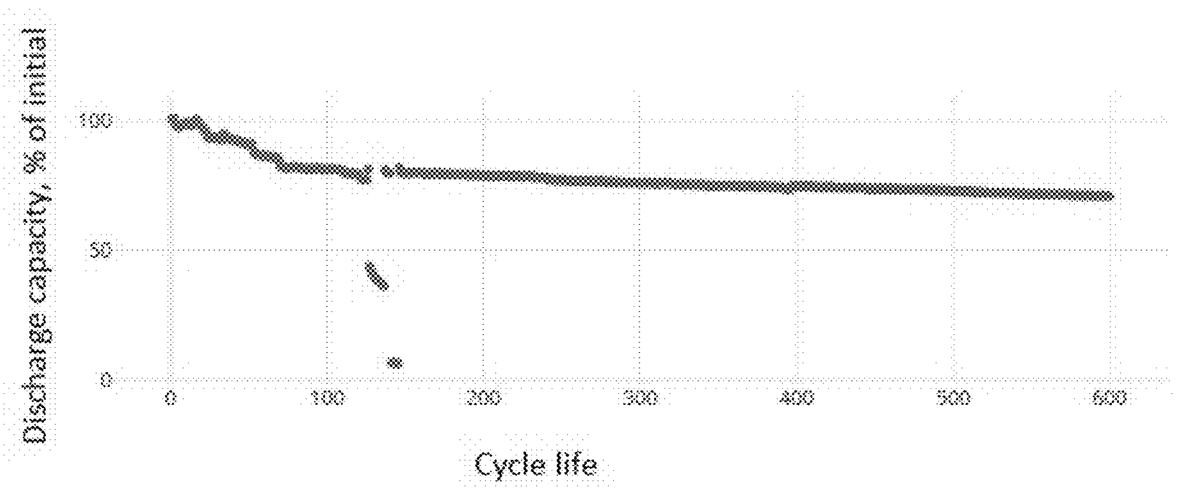
FIG. 2. Cylindrical prototype with LMFP-based cathode, artificial graphite anode, Li-ion electrolyte: 1.1M LIDFOB in EC:PC:DMC 1:1:3 1% SCN 2% FEC. After 15 cycles (including formation), working temperature was in the range (+50C; +65C), and it was cooled down up to room temperature after $80^{th}$ cycle.

FIG. 2. shows the results of a cylindrical prototype 18650 cell with an LMFP-based cathode, an artificial graphite anode and a Li-ion electrolyte with a composition of 1.1M LIDFOB in EC:PC:DMC 1:1:3 1% SCN 2% FEC. After 15 cycles (including formation), the working temperature was in the range (+50C; +65C). The cell was cooled down to room temperature after $80^{th}$ cycle.

Example 2) 1M LIDFOB in EC:PC:DMC 1:1:3 1% SCN 2% FEC

Figure 3:
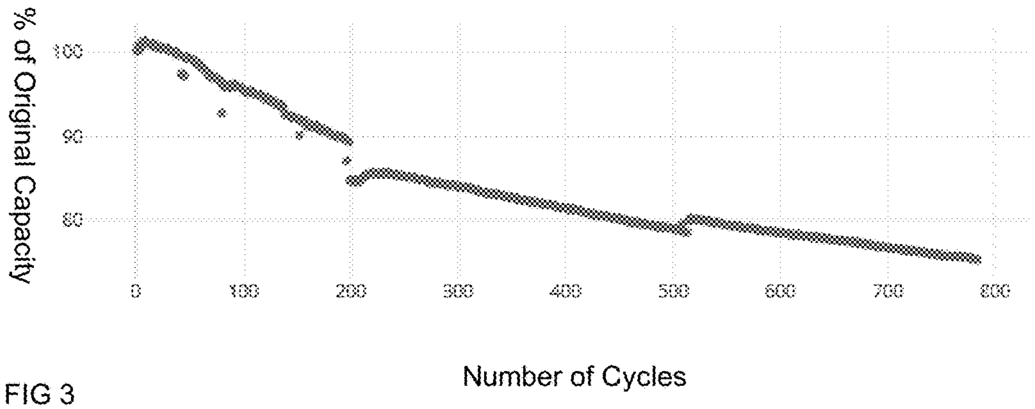
FIG. 3. Cylindrical prototype with LMFP-based cathode, artificial graphite anode, Li-ion electrolyte: 1M LIDFOB in EC:PC:DMC 1:1:3 1% SCN 2% FEC. After 15 cycles (including formation), working temperature was in the range (+45C; +55C), and it was cooled down up to room temperature after $200^{th}$ cycle.

FIG. 3. shows the results of a cylindrical prototype 18650 cell with an LMFP-based cathode, an artificial graphite anode and a Li-ion electrolyte with a composition of 1M LIDFOB in EC:PC:DMC 1:1:3 1% SCN 2% FEC. After 15 cycles (including formation), the working temperature was in the range (+45C; +55C). The cell was cooled down to room temperature after $200^{th}$ cycle.

Example 3) 1.1M LIDFOB in EC:DMC 3:7 1% SCN 2% FEC

Figure 4:
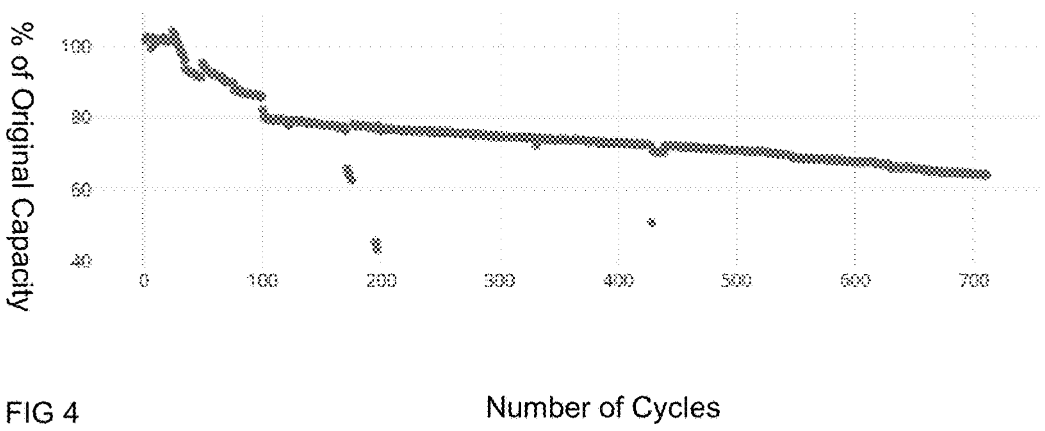
FIG. 4. Cylindrical prototype with LMFP-based cathode, artificial graphite anode, Li-ion electrolyte: 1.1M LIDFOB in EC:DMC 3:7 1% SCN 2% FEC. After 15 cycles (including formation), working temperature was in the range (+50C; +65C), and it was cooled down up to room temperature after $100^{th}$ cycle.

FIG. 4. shows the results of a cylindrical prototype 18650 cell with an LMFP-based cathode, an artificial graphite anode and a Li-ion electrolyte with a composition of 1.1M LIDFOB in EC:DMC 3:7 1% SCN 2% FEC. After 15 cycles (including formation), the working temperature was in the range (+50C; +65C). The cell was cooled down to room temperature after $100^{th}$ cycle.

Examples 4) 1M LIDFOB in EC:DMC 3:7 1% SCN 2% FEC

Figure 5:
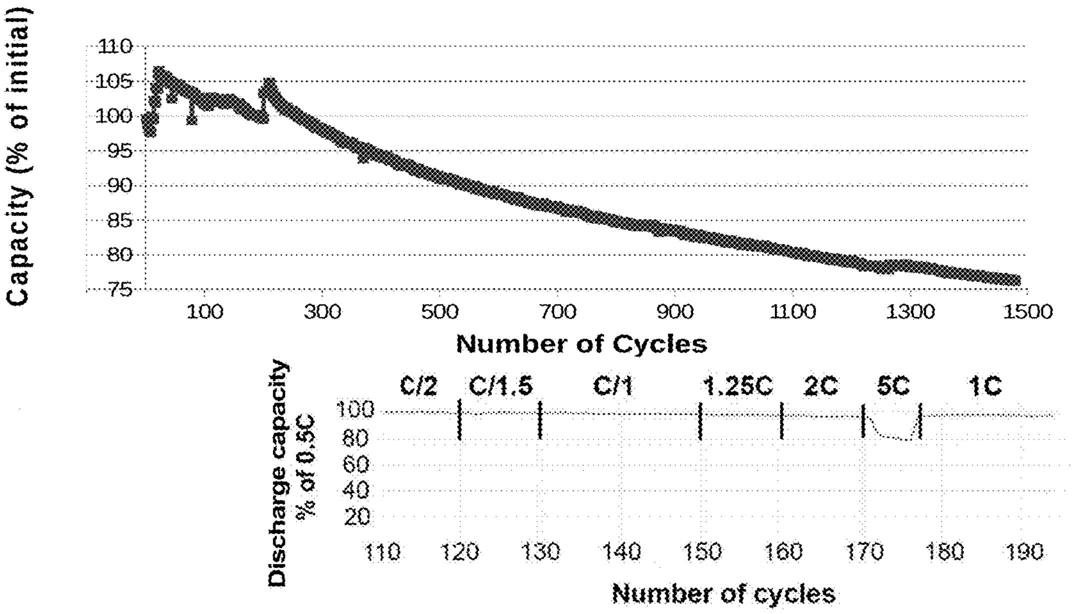
FIG. 5. Cylindrical prototype with LMFP-based cathode, artificial graphite anode, Li-ion electrolyte: 1M LIDFOB in EC:DMC 3:7 1% SCN 2% FEC. Prototype was cycling at room temperature.

FIG. 5. shows the results of a cylindrical prototype 18650 cell with an LMFP-based cathode, an artificial graphite anode and a Li-ion electrolyte with a composition of 1M LIDFOB in EC:DMC 3:7 1% SCN 2% FEC. Prototype was cycling at room temperature.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

Figure 6:
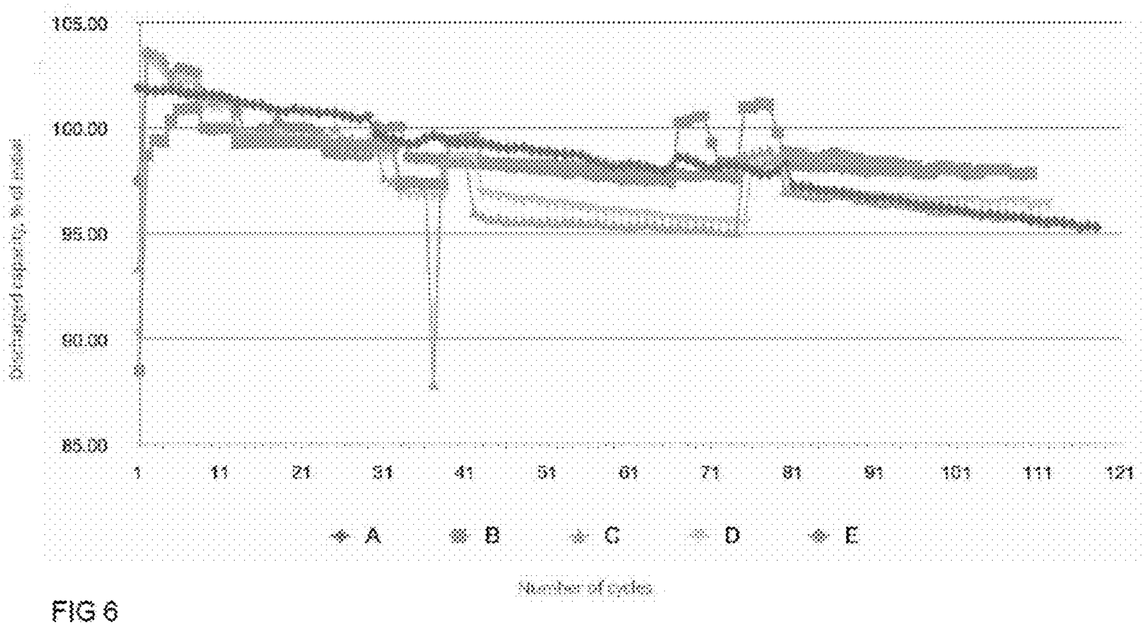
FIG. 6. Comparative performance of a commercial 18650 cylindrical cells and 18650 cylindrical cells made with the electrolyte according to the invention. A=Samsung INR 18650-30Q. B=1M LDFB ECPCDMC 113 3% FEC 2% SCN. C=1M LDFB ECDMC 37 3% FEC 2% SCN. C=1M LDFB SCNDMC 37 5% FEC. D=1M LDFB SCNDMC 10% FEC.

FIG. 6. shows the results of a cylindrical prototypes 18650 cell with an NMC-based cathode, an artificial graphite anode and a Li-ion electrolyte with different electrolyte composition at room temperature.

It is obvious to a person skilled in the art that with the advancement of technology, the basic idea may be implemented in various ways. The embodiments are thus not limited to the examples described above; instead they may vary within the scope of the claims.

The embodiments described hereinbefore may be used in any combination with each other. Several of the embodiments may be combined together to form a further embodiment. An electrolyte or an electrochemical cell, disclosed herein, may comprise at least one of the embodiments described hereinbefore. It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items. The term "comprising" is used in this specification to mean including the feature(s) or act(s) followed thereafter, without excluding the presence of one or more additional features or acts.

The invention claimed is:

1. An electrolyte for an electrochemical cell comprising a lithium salt comprising Lithium DiFluorooxalotoborate (LiDFOB) and a solvent mixture comprising at least two carbonate solvents.

2. The electrolyte of claim 1, wherein the solvent mixture comprises a minor solvent and a major solvent, and wherein the mass ratio of the minor solvent to the major solvent in the solvent mixture is approximately 2:8 to 1:1.

3. The electrolyte of claim 1, wherein at least one of the carbonate solvents is an ethylene carbonate (EC) and/or at least one of the carbonate solvents comprises a dimethyl carbonate (DMC).

4. The electrolyte of claim 1, wherein at least one of the carbonate solvents comprises propylene carbonate (PC).

5. The electrolyte of claim 1, further comprising at least two electrolyte additives, wherein at least one of the electrolyte additives comprises a carbonate-type additive or a nitrile-type additive, and/or wherein at least one of the electrolyte additives comprises a non-ionic organic additive.

6. The electrolyte of claim 5, wherein a second additive comprises a nitrile-type additive.

7. The electrolyte of claim 5, wherein at least one non-ionic organic additive comprises a cyclic carbonate based additive or dioxolane, wherein at least one cyclic carbonate based additive comprises 1,3-cyclic carbonate, chloroethylene carbonate, and/or fluoroethylene carbonate (FEC) and/or combinations thereof.

8. The electrolyte of claim 5, wherein at least one nitrile-type additive comprises an acetonitrile, adiponitrile, glutaronitrile, pimelonitrile, malononitrile (MLN) and/or a succinonitrile (SCN) and/or a combination thereof.

9. The electrolyte of claim 5, wherein the amount of any individual additive is from 0.01 mass percent to 15 mass percent of the total mass of the electrolyte.

10. The electrolyte of claim 5, wherein at least one of the non-ionic organic additives is fluoroethylene carbonate (FEC) and/or, wherein at least one of the nitrile-type additives is succinonitrile (SCN), wherein the mass proportion of the non-ionic organic additive is between 0.5% and 5% of the total mass of electrolyte and/or, wherein the mass proportion of nitrile-type additive is between 0.1% and 3% of the total mass of electrolyte.

11. The electrolyte of claim 1, wherein the electrolyte further comprises an additional lithium salt, wherein the additional lithium salt concentration is between 0.1 and 6 M and wherein the additional lithium salts comprise, Lithium tetrafluoroborate (LiBF4), Lithium Bis(oxolato)borate (LiBOB), Lithium hexafluorophosphate (LiPF6), or any combination thereof.

12. The electrolyte of claim 1, wherein the number of carbonate solvents is three, wherein the three carbonate solvents are Ethylene Carbonate (EC), Propylene Carbonate (PC) and Dimethyl Carbonate (DMC).

13. The electrolyte of claim 1, wherein the electrolyte comprises a solvent mixture comprising co-solvent DMC, co-solvent EC, and co-solvent PC, and additives SCN and FEC, wherein the mass % of each of additives SCN and FEC are less than 5%.

14. An electrolyte for an electrochemical cell comprising a lithium salt comprising a primary lithium salt, wherein the lithium salt in the electrolyte comprises at least 50 mass % of the primary lithium salt, and a solvent mixture comprising succinonitrile (SCN) as a co-solvent and one or more carbonate-type co-solvents, wherein the electrolyte comprises at least 5 mass % of the carbonate-type co-solvents, and wherein at least one of the carbonate-type co-solvent has SEI-forming capability wherein the primary lithium salt is Lithium DiFluorooxalotoborate (LiDFOB), where SEI refers to Solid Electrolyte Interphase.

15. The electrolyte of claim 14, wherein one carbonate-type co-solvent is fluoroethylene carbonate (FEC), and wherein another carbonate-type co-solvent is DMC.

16. The electrolyte of claim 15, further comprising a secondary lithium salt, wherein the lithium salt in the electrolyte comprises less than 50 mass % of the secondary lithium salt.

17. The electrolyte of claim 16, wherein the secondary lithium salt is a boron containing lithium salt, wherein the boron containing lithium salt is $LiBF_4$ and/or LiBOB or any combination thereof.

18. An electrochemical cell comprising the electrolyte of claim 17, an anode, and a cathode, wherein the cathode comprises Lithium manganese nickel oxide (LMNO), Lithium-Manganese-Iron-Phosphate (LMFP), Nickel-Cobalt-Manganese oxide (NCM), Lithium-Cobalt-Oxide (LCO), Nickel-Cobalt-Aluminum (NCA) and/or Lithium Iron Phosphate (LFP).

19. The electrochemical cell of claim 18, wherein the anode comprises lithium, carbon and/or silicon, wherein the anode comprises natural and/or artificial graphite, hard carbon, graphite-silicon mixture, silicon, silicon oxide (SiO), silicon, LTO (Lithium-Titanium-Oxide) and/or metallic lithium.

* * * * *